G. M. HALL.
NUT LOCK.
APPLICATION FILED AUG. 24, 1912.
1,057,482.
Patented Apr. 1, 1913.
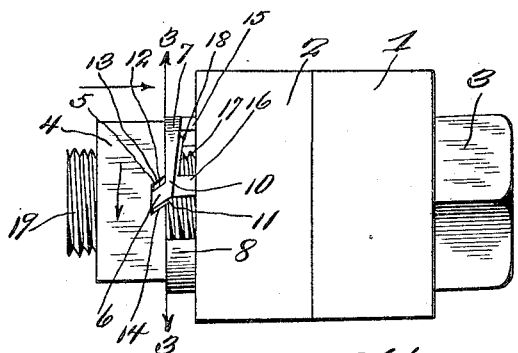
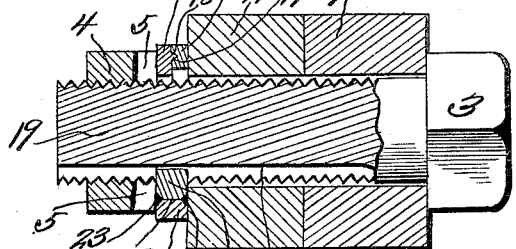
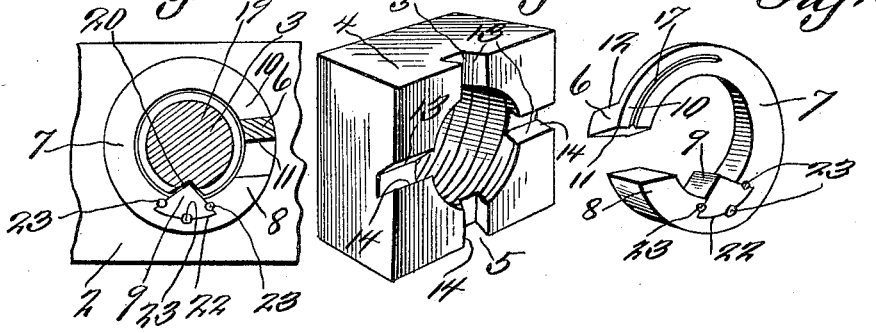
Witnesses
Inventor
G. M. Hall,
By D. Swift & Co.
his Attorneys

UNITED STATES PATENT OFFICE.

GREEN M. HALL, OF CANTON, NORTH CAROLINA, ASSIGNOR OF ONE-HALF TO ALONZO H. ROBINSON, OF CANTON, NORTH CAROLINA.

NUT-LOCK.

1,057,482.  Specification of Letters Patent.  Patented Apr. 1, 1913.

Application filed August 24, 1912. Serial No. 716,856.

*To all whom it may concern:*

Be it known that I, GREEN M. HALL, a citizen of the United States, residing at Canton, in the county of Haywood and State of North Carolina, have invented a new and useful Nut-Lock; and I do hereby declare the following to be a full, clear, and exact description of the invention, such as will enable others skilled in the art to which it appertains to make and use the same.

This invention relates to a new and useful nut lock.

One of the objects of the invention is the provision of a spring split ring, provided with a laterally extending lug having opposite beveled faces adapted to engage recesses (which are correspondingly shaped) of a nut, for locking the nut in position.

Another object of the invention is the provision of means interposed between the spring end of the ring and that which is bolted by the bolt of the nut lock, in order to afford a solid surface for the ring.

Another object of the invention is the provision of guides for said members, for not only guiding them, but preventing them from displacement.

Another object of the invention is to provide a ring with a V-shaped lug of substantially soft steel or like metal, to engage a groove in the shank of the bolt to prevent the ring from turning. The ring is constructed of the best spring steel, in order to perform its functions to the best advantage. The V-shaped lug is secured in a dove-tailed manner in a recess in the ring, and to hold said lug in said recess, indentures are made in the lug and the ring. It has been found through experience that it is much better and more advantageous to construct the lug of softer material than the ring, and as an independent part, hence the lug and the ring are made separable.

The drawings disclose certain features of construction, but in practical fields these features may necessitate alterations, to which the patentee has a right, provided the alterations fall within the scope of what is claimed.

The invention comprises further features and combination of parts, as hereinafter set forth, shown in the drawings and claimed.

In the drawings:—Figure 1 is a view in side elevation, showing the application of the improved nut lock. Fig. 2 is a sectional view through the same. Fig. 3 is a sectional view on line 3—3 of Fig. 1. Fig. 4 is a detail perspective view of the spring split ring. Fig. 5 is a detail perspective view of the nut having a plurality of recesses, the radial walls of which are inclined.

Referring to the drawings 1 and 2 designate two members, which are secured together by the bolt 3 and nut 4. In order to securely lock the nut 4, the same is provided with a plurality of substantially radial recesses 5, any one of which is adapted to receive the laterally extending lug 6 of the split spring ring 7. This ring from the end 8, or rather a little beyond the lug 9 tapers, as shown, gradually to the end 10, where the lug 6 is located. When screwing the nut 4 home this tapering portion of the ring yieldably gives, in order to pass the higher parts of the nut between the recesses. The lug 6 is provided with opposite beveled surfaces 11 and 12, and the surface 11 coöperates with a correspondingly shaped surface of any one of the recesses 5, in order to render it difficult to unscrew the nut, while the surface 12 coöperates with the surface 13 of each recess 5, in order to permit the nut to be screwed home. The surface corresponding to the surface 11, is designated by the numeral 14.

After the nut has been screwed home, and the lug 6 having entered the proper recess, the members 15 and 16 are inserted between the tapered end of the split ring and the member 2, in order to afford a solid bearing surface for the tapered end of the ring, and to securely hold the lug 6 in the recess, as shown in Fig. 1. To arrange the members 15 and 16 in place, they are first inserted between the ends 10 and 8 of the ring, in proper position, whereby the elongated tongue 17 of the split ring may enter the recesses 18 of said members 15 and 16, as they are being arranged in the positions shown in Fig. 1.

The shank 19 of the bolt 3 is provided with an elongated groove 20, into which the lug 9 of the ring enters, thereby providing means to prevent the ring from partial rotatory displacement, as the nut is being screwed on the shank. This lug 9 is V-shaped in contour, and is made separate from the ring, but is arranged in a correspondingly shaped recess 22 of the ring. In order to hold the lug in the recess 22, indentures 23 are constructed as shown in Figs. 2, 3 and 4. The lug 9 is made of soft metal, in order to be easily indented, in order to fasten the lug in place by the indentures. The object in making the lug detachable, is the fact that the same becomes worn, owing to being subjected to considerable wear, and when such is the case the lug may be renewed, which could not be the case if the lug was made a part of the ring. If the lug 9 was made a part of the ring, an entire new ring would have to be substituted for an old ring, the lug of which has become worn. Furthermore, by making the lug 9 of soft metal, the same may be pounded, in order to be made to fit the groove 20 closely. However, the lug 9 may be shrunk in said recess 22.

From the foregoing it will be noted that there has been devised a simple and efficient and inexpensive nut lock construction, and one which has been found desirable and practical.

The invention having been set forth, what is claimed as new and useful is:—

In combination, a bolt having a shank and provided with a nut threaded on said shank and adapted for clamping two members together, the nut having a plurality of substantially radial recesses, the opposite walls of which are beveled, a split spring ring adapted to be arranged between the nut and one of the members and provided with a tapering end terminating in a lateral lug adapted to enter any one of the recesses of the nut, the lateral lug having opposite beveled surfaces to coöperate with the beveled walls of the recesses, whereby the lateral lug may move in and out of said recesses upon screwing the nut home, and to render it difficult to unscrew the nut, the tapering end of the ring yields freely in order to allow the lateral lug to move in and out of said recesses and to pass over the higher parts of the nut between said recesses, the ring having an elongated tongue, and members interposed between the ring and one of the first members and guided on the elongated tongue to insure a solid bearing for the nut when screwed home, and means to prevent the ring from turning on the shank.

In testimony whereof I have signed my name to this specification in the presence of two subscribing witnesses.

GREEN M. HALL.

Witnesses:
J. N. MEASE,
W. T. SHARP.

Copies of this patent may be obtained for five cents each, by addressing the "Commissioner of Patents, Washington, D. C."